Patented Jan. 3, 1928.

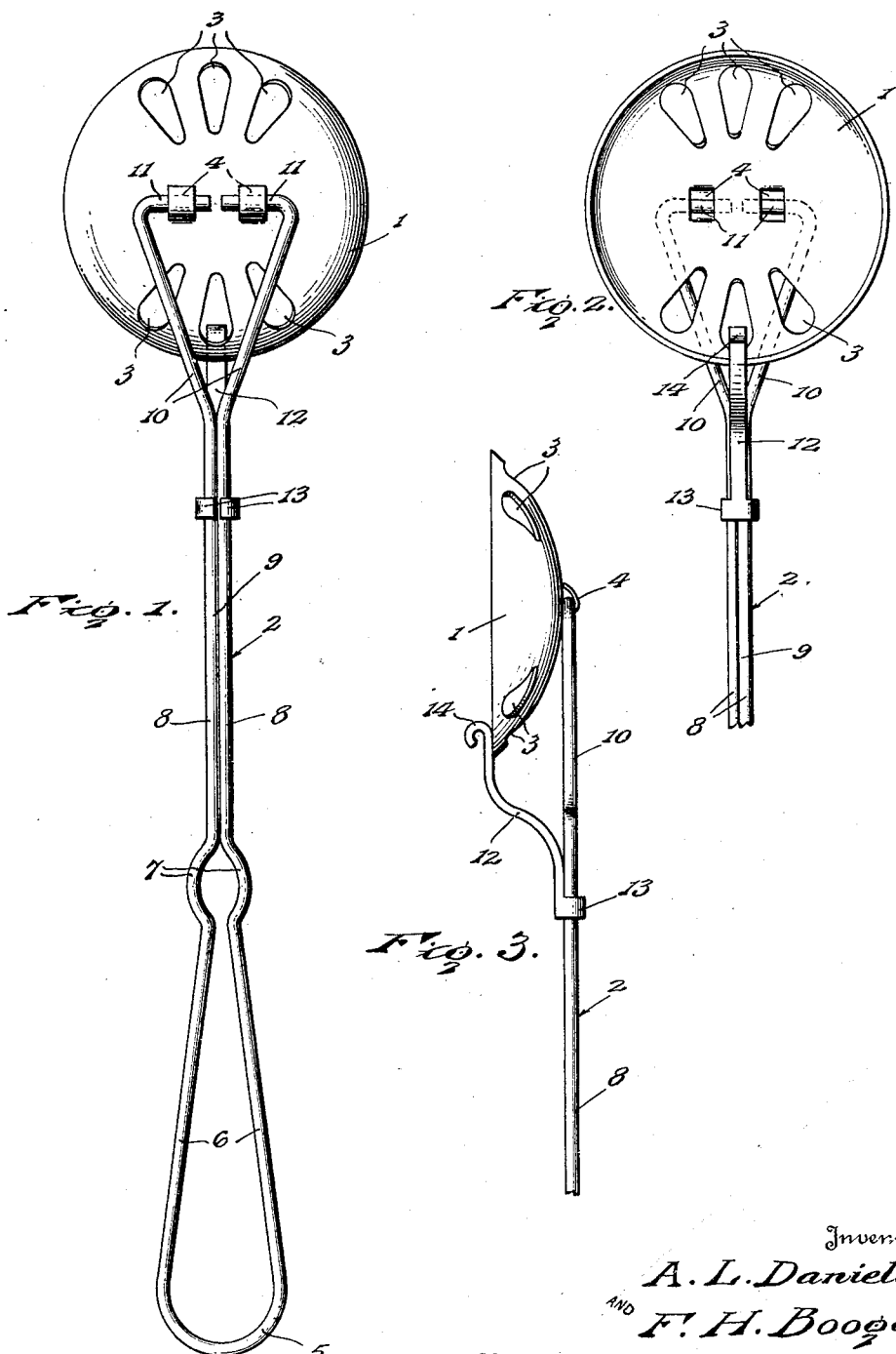

1,654,965

UNITED STATES PATENT OFFICE.

ADDISON L. DANIELS AND FRANK H. BOOGE, OF SIOUX CITY, IOWA; SAID BOOGE ASSIGNOR TO SAID DANIELS.

STIRRING SPOON.

Application filed September 16, 1926. Serial No. 135,858.

This invention relates to kitchen implements and more particularly to a stirring spoon.

One object of the invention is to provide a spoon having a bowl pivotally connected with its handle so that it may be turned to dispose the handle axially of the bowl or substantially radial thereof.

Another object of the invention is to provide the spoon with a latch to securely but releasably retain the bowl in a set position with the handle projecting radially therefrom.

Another object of the invention is to permit the handle to be formed from a strand of strong wire and retained in pivotal engagement with the bowl by the latch which releasably holds the bowl in a set position.

The invention is illustrated in the accompanying drawing, wherein

Figure 1 is a view showing the spoon in rear elevation;

Fig. 2 is a view showing the bowl and a portion of the handle in front elevation, and Fig. 3 is a side elevation of the bowl and a portion of the handle.

The stirring spoon constituting the subject-matter of this invention includes a bowl 1 and a handle 2, the forward end of which is pivotally connected with the bowl. The bowl 1 is preferably formed of sheet metal, although other materials may be employed and is of a concavo-convex formation, as shown in Fig. 3. The marginal edge of the bowl is preferably circular and is disposed, as shown in Fig. 2, so that it may have flat contacting engagement with the bottom or walls of a sauce pan or other cooking utensil when in use. Openings 3 which are elongated are cut in the bowl adjacent its marginal edge and are preferably arranged in groups spaced circumferentially of the bowl. The openings are disposed radially of the bowl, as shown in Figs. 1 and 2, and taper toward their inner ends. These openings permit liquid or semi-liquid material in a pan to pass through the bowl of the spoon so that the contents of a pan may be readily stirred. In order to attach the handle to the bowl, there has been provided hinge ears 4 consisting of tongues struck from the central portion of the bowl at opposite sides of its center and bent to project from the convex face of the bowl. It will thus be seen that the bowl may be formed from circular disks cut from sheet metal and pressed to assume the desired configuration by suitable dies.

The handle 2 is formed from a strand of strong wire which is bent intermediate its length to form a hand grip 5 having side arms 6 which converge forwardly. At the forward end of the hand grip the wire is bent to form outwardly bowed portions 7 and the strand is then bent to form straight sections 8 which contact with each other and cooperate to form the shank 9 of the handle. After forming the shank, the end portions of the strand are bent to form forks 10 which extend forwardly in divergent relation to each other and at their forward ends are bent to provide fingers 11 which extend toward each other between the forks and are adapted to project through the bearing ears 4. By this arrangement the bowl is pivotally connected with the handle and the handle may be swung from a position substantially axial thereof to a position in which it projects radially from the bowl. Therefore, the bowl may be engaged with the bottom or walls of a cooking utensil, such as a preserving kettle or the like, and the contents of the utensil thoroughly stirred and scraped loose so that it may not become scorched by adhering to the utensil. When whipping cream and the like, it is desirable to have the bowl held stationary with the handle projecting radially from it, as shown in the drawing. There has, therefore, been provided a latch 12 formed from a strip of metal which extends longitudinally of the handle and adjacent its rear end is provided with side arms 13 which are bent about the shank forming portions 8 of the strand from which the handle is formed. The arms 13 serve to slidably connect the latch with the handle so that it may be moved longitudinally thereon into and out of position to dispose its free forward end portion 14 in overlapping engagement with the bowl. By an inspection of Fig. 3, it will be readily seen that the latch may be easily moved into position to engage the bowl and when in the position shown in this figure the bowl will be securely held in a set position. It should also be noted that the arms of the latch prevent the shank forming portions 8 from accidentally moving away from each other and releasing the bowl while the spoon is in use. When, however, it is desired to clean the spoon, the latch may be slid rearwardly upon the shank and the forks may then be easily spread to move their fingers out of engagement with the ears 4. The bowl and handle may then be thoroughly cleaned and the spoon reassembled. This would also permit modified forms of bowls to be provided for use in connection with a common handle and a bowl easily removed from a handle and another substituted when necessary.

Having thus described the invention, we claim:

1. A stirring spoon comprising a concavo-convex bowl, a handle pivotally connected with the convex side of said bowl, and means slidable longitudinally upon said handle into and out of position for engaging said bowl and releasably holding the bowl in a set position with the handle projecting transversely therefrom.

2. A stirring spoon comprising a concavo-convex bowl, bearing ears projecting from the convex face of said bowl, a handle having a shank provided with forks bent to provide fingers engaged with said ears, and a latch carried by said shank and slidable longitudinally thereon into position to engage said bowl and releasably hold the bowl in a set position with the handle extending transversely therefrom.

3. A stirring spoon comprising a concavo-convex bowl, bearing ears projecting from the central portion of said bowl, a handle having a shank provided with forks diverging forwardly and bent to provide fingers engaged with said ears, and a latch carried by said shank and slidable longitudinally thereon into position to engage said bowl and releasably hold the bowl in a set position with the handle extending radially therefrom.

4. A stirring spoon comprising a concavo-convex bowl, bearing ears projecting from the central portion of said bowl, a handle consisting of a strand bent intermediate its length to form a hand hold and shank extending forwardly therefrom and terminating in forks provided at their forward ends with fingers engaged in said ears to pivotally mount the handle, and a latch slidable longitudinally upon the shank of said handle and adapted to engage said bowl and releasably hold the bowl in a set position with the handle extending radially therefrom.

5. A stirring spoon comprising a concavo-convex bowl, bearing ears projecting from the central portion of said bowl, a handle consisting of a strand bent intermediate its length to form a hand hold and shank extending forwardly therefrom and terminating in forks provided at their forward ends with fingers engaged in said ears to pivotally mount the handle, and a latch consisting of a strip extending longitudinally of the handle and having one end provided with side arms bent about the shank to slidably mount the latch and its other end portion spaced from the shank and adapted to engage said bowl and releasably hold the bowl in a set position with the handle extending radially therefrom.

6. A stirring spoon comprising a concavo-convex bowl, a handle having portions movable towards and away from each other and provided with pintle members pivotally engaged with said bowl, and a latch for said bowl embracing the handle to control movement of its said portions towards and away from each other and adjustable longitudinally upon said handle into and out of position to engage said bowl.

7. A stirring spoon comprising a concavo-convex bowl, bearing ears projecting from the convex face of said bowl, a handle having portions movable towards and away from each other and pivotally engaged with said ears to mount the handle for swinging movement from a position substantially axially of the bowl to a position transversely thereof, and a latch embracing said handle to control movement of its portions towards and away from each other and slidable longitudinally upon the handle into and out of position to engage said bowl and releasably hold the handle transversely thereof.

In testimony whereof we affix our signatures.

ADDISON L. DANIELS. [L. S.]
FRANK H. BOOGE. [L. S.]